United States Patent [19]

D'Souza et al.

[11] Patent Number: 5,590,347
[45] Date of Patent: Dec. 31, 1996

[54] METHOD AND SYSTEM FOR SPECIFYING ALTERNATE BEHAVIOR OF A SOFTWARE SYSTEM USING ALTERNATE BEHAVIOR INDICIA

[75] Inventors: David J. D'Souza, Kirkland; Neil Konzen, Bellevue; David N. Weise, Kirkland, all of Wash.

[73] Assignee: Microsoft Corporation, Redmond, Wash.

[21] Appl. No.: 987,363

[22] Filed: Dec. 7, 1992

[51] Int. Cl.⁶ .................................................. G06F 9/445
[52] U.S. Cl. ............................................ 395/800; 395/500
[58] Field of Search ............................ 395/600, 700, 395/800; 364/222.82

[56] References Cited

U.S. PATENT DOCUMENTS

| | | | |
|---|---|---|---|
| 4,425,618 | 1/1984 | Bishop et al. | 395/375 |
| 4,558,413 | 12/1985 | Schmidt et al. | 395/600 |
| 4,809,170 | 2/1989 | Leblang et al. | 364/DIG. 1 |
| 4,833,594 | 5/1989 | Familetti et al. | 395/700 |
| 5,155,837 | 10/1992 | Liu et al. | 395/500 |
| 5,212,789 | 5/1993 | Rago | 395/600 |
| 5,274,815 | 12/1993 | Trissel et al. | 395/700 |
| 5,339,430 | 8/1994 | Lundin et al. | 395/700 |
| 5,359,730 | 10/1994 | Marron | 395/650 |
| 5,410,703 | 4/1995 | Nilsson et al. | 395/700 |

OTHER PUBLICATIONS

*Microsoft MS–DOS User's Guide and Reference,* Version 5.0, 1991, pp. 561–564.
Segal, "Extending dynamic program updating systems to support distributed systems that communicate via remote evaluation," IEE, Mar. 1992, pp. 188–199.

Primary Examiner—Alyssa H. Bowler
Assistant Examiner—Walter D. Davis
Attorney, Agent, or Firm—Seed And Berry LLP

[57] ABSTRACT

A method and system for operating a server with a plurality of clients is provided. In a preferred embodiment of the present invention, the server is designed to provide a service to an activated client. The service provided is comprised of both common steps and a behavior group. The behavior group includes alternative behaviors, each of which corresponds to a series of steps that are only a portion of the steps designed to be executed when the service is requested by a single group of clients. The common steps are steps designed to be executed for all of the clients. An indicium is associated with the activated client. The indicium indicates which of the alternative behaviors is to be provided to the activated client. When the activated client requests the service from the server, the indicium associated with the activated client is checked. The series of steps corresponding to the alternative behavior indicated by the checked indicium are then executed. The common steps are also executed.

31 Claims, 10 Drawing Sheets

METHOD AND SYSTEM FOR SPECIFYING ALTERNATE BEHAVIOR OF A SOFTWARE SYSTEM USING ALTERNATE BEHAVIOR INDICIA

TECHNICAL FIELD

The invention relates generally to a method and system for correcting incompatibility failures between a server software system and a client software system, and, more specifically, to a method and system for specifying alternate behavior of a server software system.

BACKGROUND OF THE INVENTION

Many software systems are designed to work in conjunction with other software systems. Examples include application programs that work in conjunction with operating systems, network clients that work in conjunction with network servers, and telecommunications software packages that work in conjunction with host computer interfaces. In each of these pairs, one of the software systems provides services to the other software system. The software system providing the services is called the server. The software system receiving the services is called the client. The interface between client and server, called the Application Program interface (API), is typically implemented as a set of routines that a client calls. A developer of a server publishes a specification defining the input, output, and behavior of each API routine. Developers of clients use these specifications to develop clients that are compatible with the server.

Thus, a client is dependent on the behavior of its servers. When the server is modified in a way that changes its behavior (e.g., when a new version is released), behavior-dependent clients may be incompatible with the modified server and fail to work correctly. This failure is known as incompatibility failure.

Two kinds of modifications of servers constitute potential sources of incompatibility failure: bug corrections and enhancements. A bug correction is the modification of the behavior of an API routine that is inconsistent with the routine's specification. The inconsistency is generally the result of a programming error, or "bug." Server bug correction causes incompatibility failure when the client that calls the API routine is inconsistent with that routine's specification. This inconsistency can arise in two ways. First, the client could have originally been designed in a way inconsistent with the routine's specification. However, the server bug could have prevented discovery of the inconsistency of the client during testing. When the server bug is corrected, the server becomes consistent with the specification, while the client remains inconsistent. Second, the client could have originally been designed in a way consistent with the routine's specification. When the consistent client fails during testing because of the server bug, the client would be redesigned to work with the server bug. After redesign, the client would no longer be consistent with the routine's specification, and thus would not work with the server.

Server bug correction is needed when the behavior of the server is inconsistent with its specification. An example of server bug correction capable of causing an incompatibility failure is the removal of code that translates text returned to clients into uppercase. The server's specification calls for the server to copy some text returned to clients from external sources without regard for case. Since text returned by the server had formerly contained only uppercase text, some clients were built without the ability to parse lowercase text. When the code for translating into uppercase is removed from the server, these clients fail.

The second kind of modification of the server that might cause an incompatibility failure is an enhancement. An enhancement can change the inputs, outputs, or behavior of an API routine. Server developers usually make every effort to make enhancements backward compatible. However, this is sometimes impossible. If the enhanced server is not backward compatible, incompatibility failure results.

An example of a server enhancement capable of causing an incompatibility failure is the addition of code that determines whether the server actually needs to send the client a certain message and omits sending the message when it is not needed. The old server sent clients a message requesting the recalculation of a window's size each time the window moved, as well as when the window was resized. Since recalculation is not necessary when the window simply moves, a server enhancement causing the server to omit sending this message in response to a window move introduces greater efficiency. This enhancement results in an incompatibility failure with some clients that do more than recalculate window size in response to this message.

Both kinds of modifications involve replacing old steps with new steps. When this happens, an old server becomes a new server. FIG. 1A is a flow diagram showing a portion of an old server, corresponding to a single API routine. FIG. 1B is a flow diagram of the same API routine after modification. FIG. 1A shows that the old client routine consists of steps 101-152. FIG. 1B shows that, in the new server routine, steps 101-150 remain intact, and that old steps 151-152 are replaced with new steps 161-163. If the old steps provide an old behavior upon which any clients are dependent, and the new steps fail to provide that behavior, incompatibility failure will result. In such cases, the new steps are known as incompatible steps.

In order to avoid an incompatibility failure, some new servers perform their old behaviors for the benefit of certain clients. Developers typically include substantially all of the code for one or more earlier versions of the server along with a new version of the server. For clients that are dependent on behaviors of an earlier version, the server executes all of the code for that earlier version instead of the code for the new version.

FIGS. 2A–2B are flow diagrams that illustrate this approach. FIG. 2A is a flow diagram of an old server. The old server consists of old steps 202-249. FIG. 2B is a flow diagram of a new server. In step 250, the server determines the version of the server for which a client was developed. If the client was developed for the old version, then the server executes old code steps 202-249, else the server executes new code steps 252-299.

This approach has shortcomings. First, it causes the size of the code to grow very quickly, making the code more difficult and more expensive to maintain, transport, and store. Second, this approach deprives clients that are incompatible with an isolated new behavior of all of the enhancements and bug corrections of the new version not related to that new behavior.

SUMMARY OF THE INVENTION

It is an object of the present invention to provide a method and system for operating a server with a plurality of clients and performing one of a plurality of alternative behaviors.

It is another object of the present invention to provide a method and system for operating a server with a plurality of clients and optionally performing an optional behavior.

It is a further object of the present invention to provide a method and system for adapting a server that provides a service to a first group of one or more clients to also provide the service to a second group of one or more clients.

These and other objects, which will become apparent as the invention is more fully described below, are obtained by an improved method and system for operating a server with a plurality of clients is provided. In a preferred embodiment of the present invention, the server is designed to provide a service to an activated client. The service provided is comprised of both common steps and a behavior group. The behavior group includes alternative behaviors, each of which corresponds to a series of steps that are only a portion of the steps designed to be executed when the service is requested by a single group of clients. The common steps are steps designed to be executed for all of the clients. An indicium is associated with the activated client. The indicium indicates which of the alternative behaviors is to be provided to the activated client. When the activated client requests the service from the server, the indicium associated with the activated client is checked. The series of steps corresponding to the alternative behavior indicated by the checked indicium are then executed. The common steps are also executed.

DETAILED DESCRIPTION OF THE INVENTION

The present invention provides a method and system for correcting incompatibility failures. A modified, or new, software server is adapted to perform certain of its pre-modification, or old, behaviors for the benefit of certain software clients. The adapted server determines whether to perform the old behavior based on a bit array associated with each client. Bit arrays are also referred to more generally herein as "series of indicia" of "aggregations of indicia." Each bit in the array is associated with an old behavior that can be performed by the adapted server. If the bit associated with an old behavior is set, the adapted server performs the old behavior.

Figure 3:
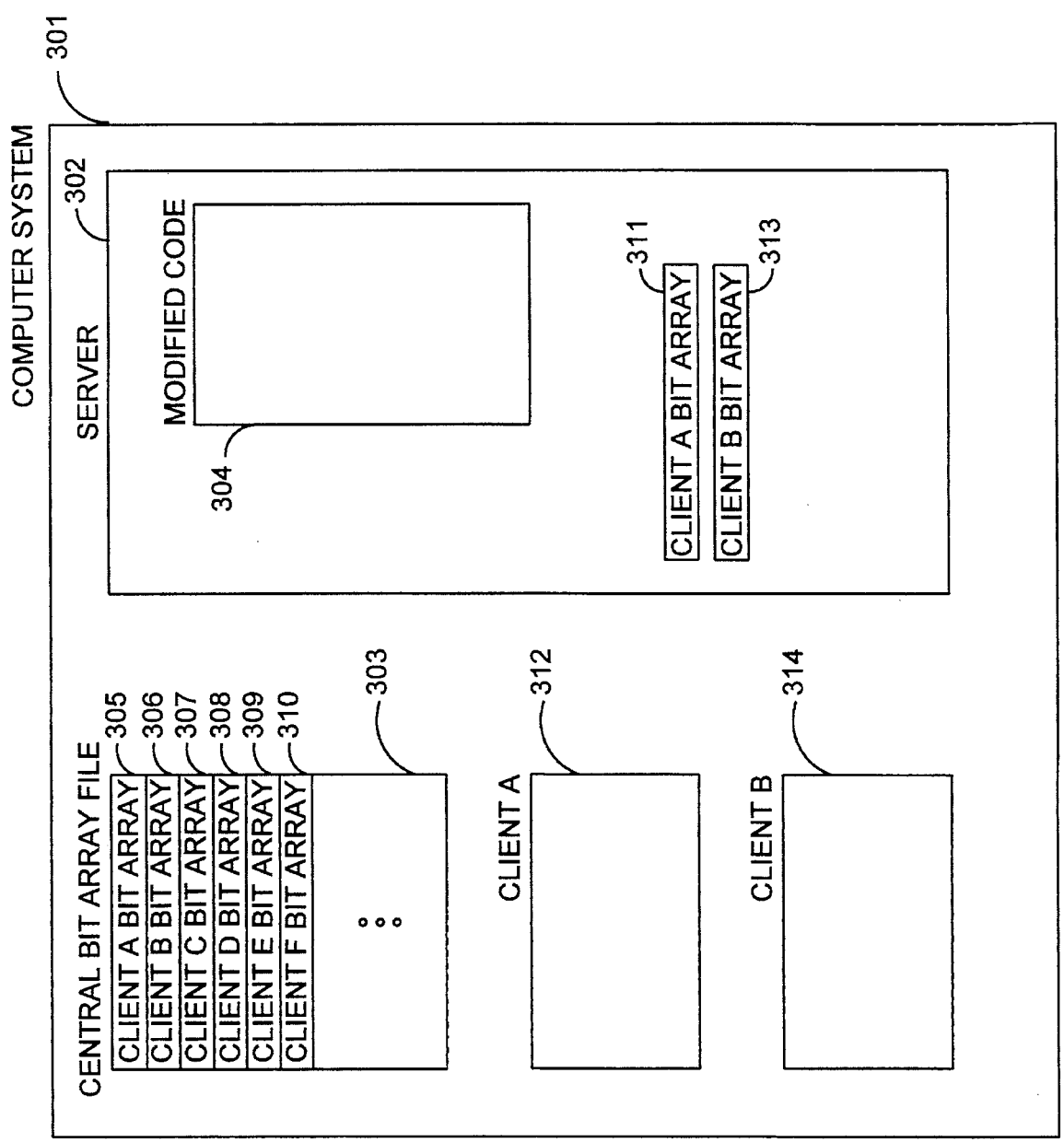
FIG. 3 is a block diagram of the adapted server running on a computer system.

FIG. 3 is a block diagram of the adapted server running on a computer system. The computer system 301 is preferably a general-purpose computer with a central processing unit, computer memory, and input/output devices. The computer system 301 contains an adapted server 302, a central bit array file 303, and clients 312 and 314. The adapted server contains its adapted code 304. The central bit array file contains a bit array for each client. When a client is activated (i.e., starts executing), the server loads the client's bit array from the central bit array file, if a bit array exists for the client. While a client is executing and the server is providing it with services, the server checks elements of the client's loaded bit array in order to determine whether to perform a particular old behavior for the client.

In one embodiment, the adapted server is the Microsoft Windows operating system version 3.1, the old server is Microsoft Windows version 3.0, and the clients are applications programs designed to run under Microsoft Windows. The clients interface with the server by calling API routines within the server.

To correct incompatibility failures caused by bug corrections and enhancements, a developer adds substitute steps to the new server that simulate the old behaviors on which clients are dependent. In the case of each such old behavior, the substitute steps are executed only for those clients that are dependent on the old behavior.

Figure 1A:
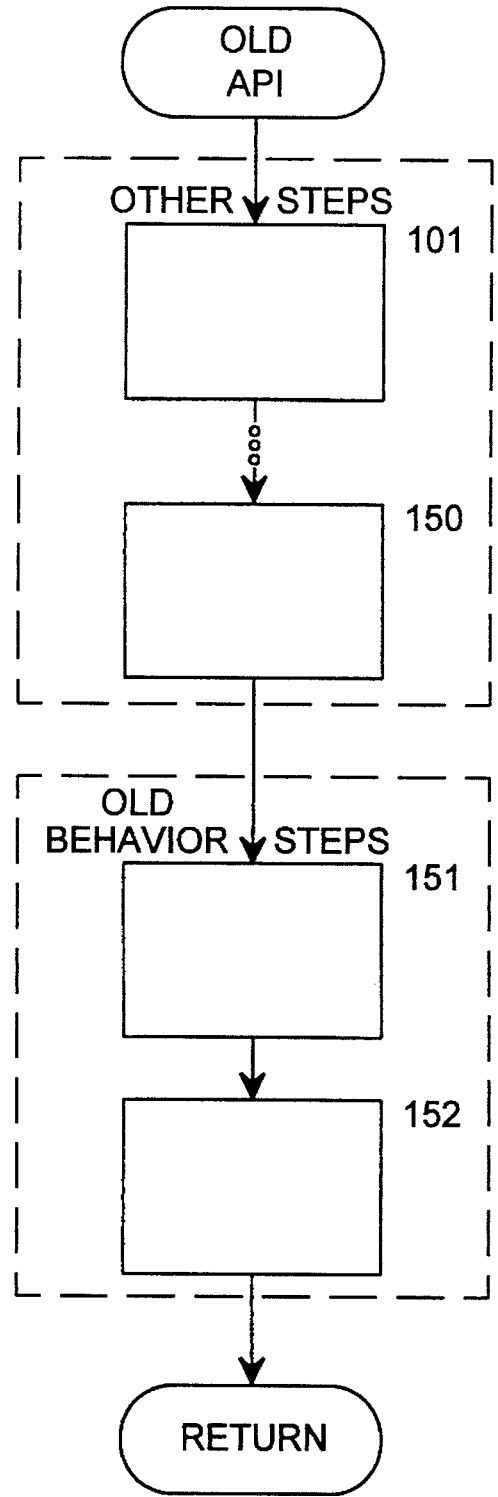
FIG. 1A is a flow diagram showing a portion of an old server, corresponding to a single API routine.
Figure 1B:
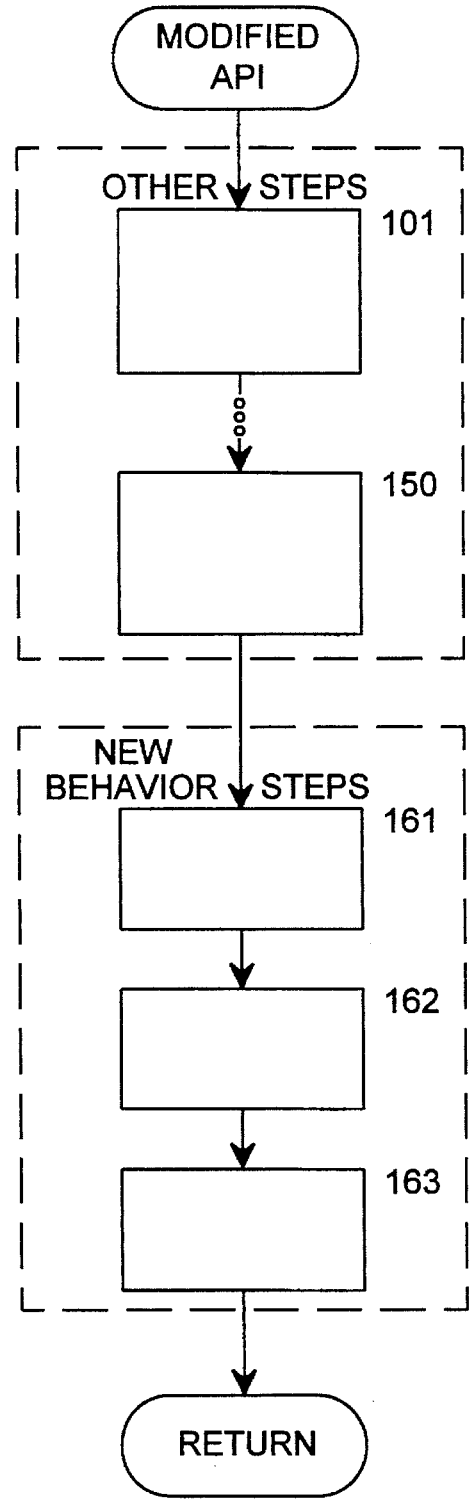
FIG. 1B is a flow diagram of the same API routine after modification.
Figure 1C:
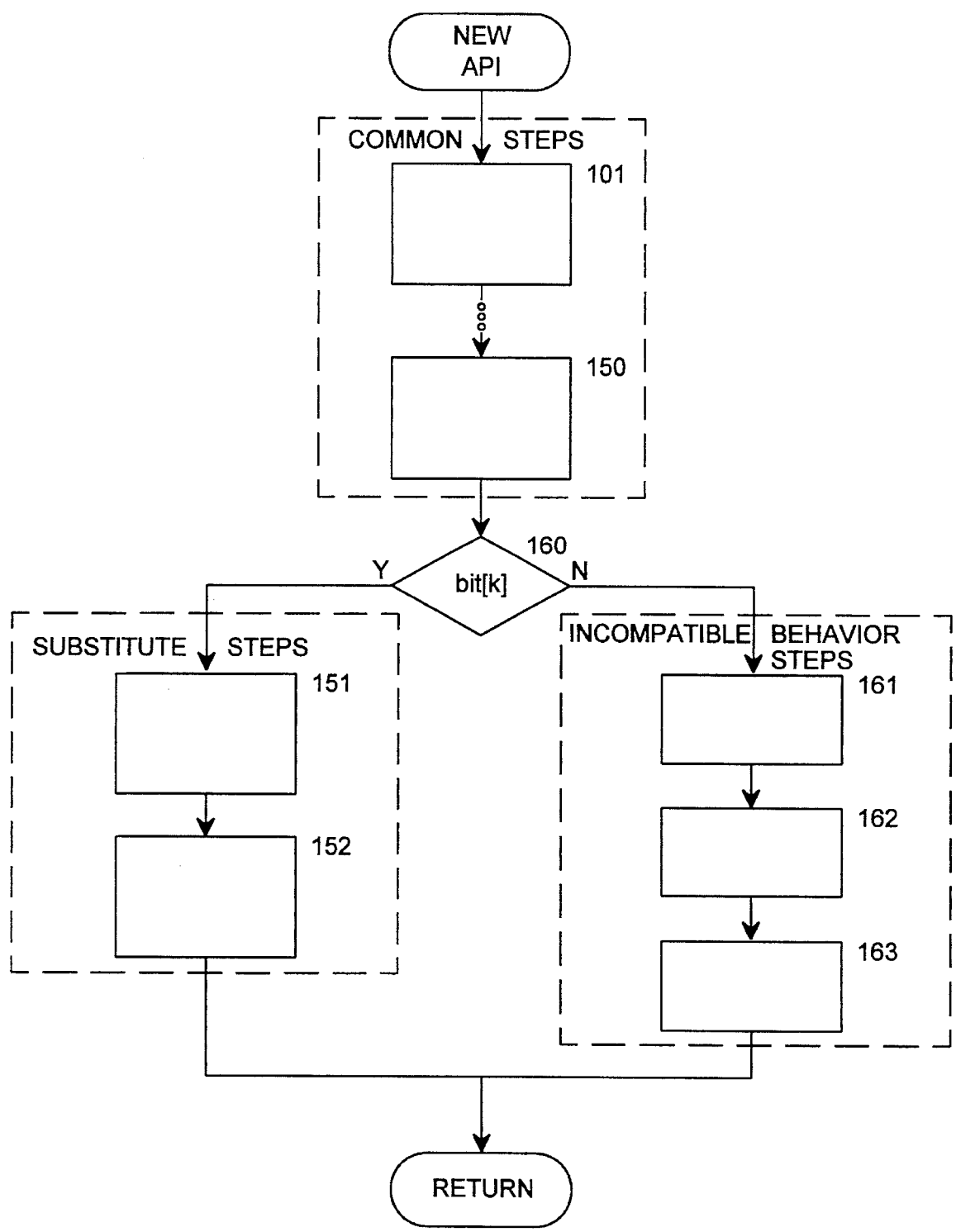
FIG. 1C is a flow diagram of an adapted API routine.
Figure 2A:
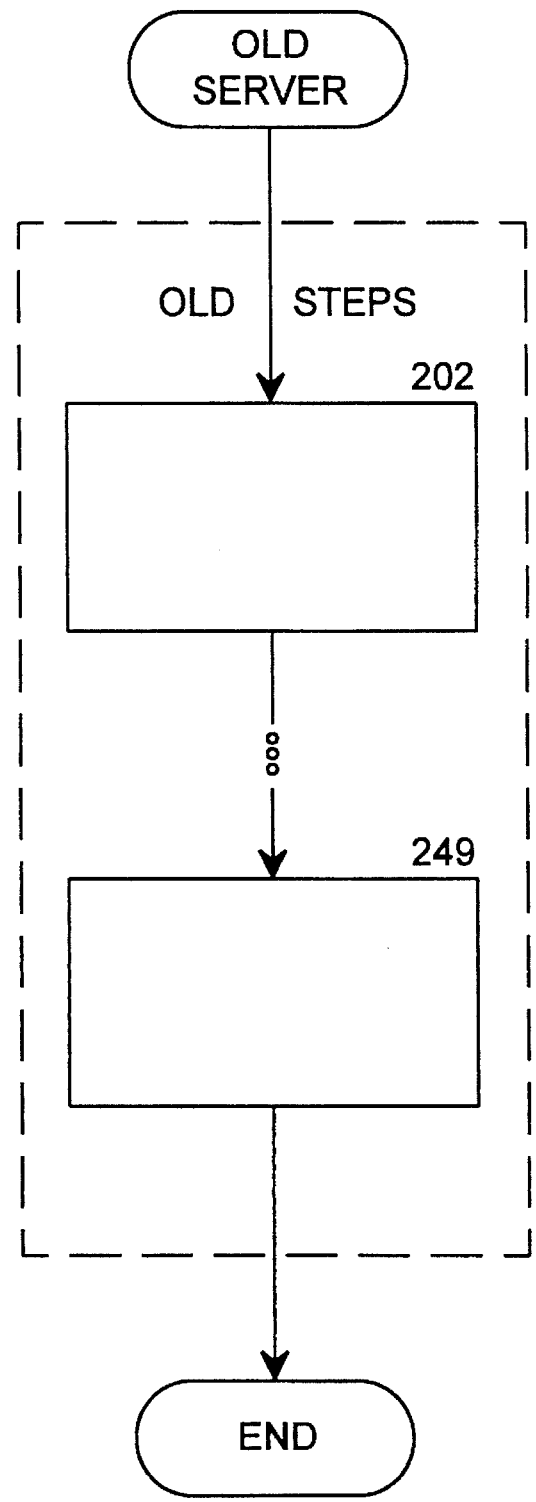
FIG. 2A is a flow diagram of an old server.
Figure 2B:
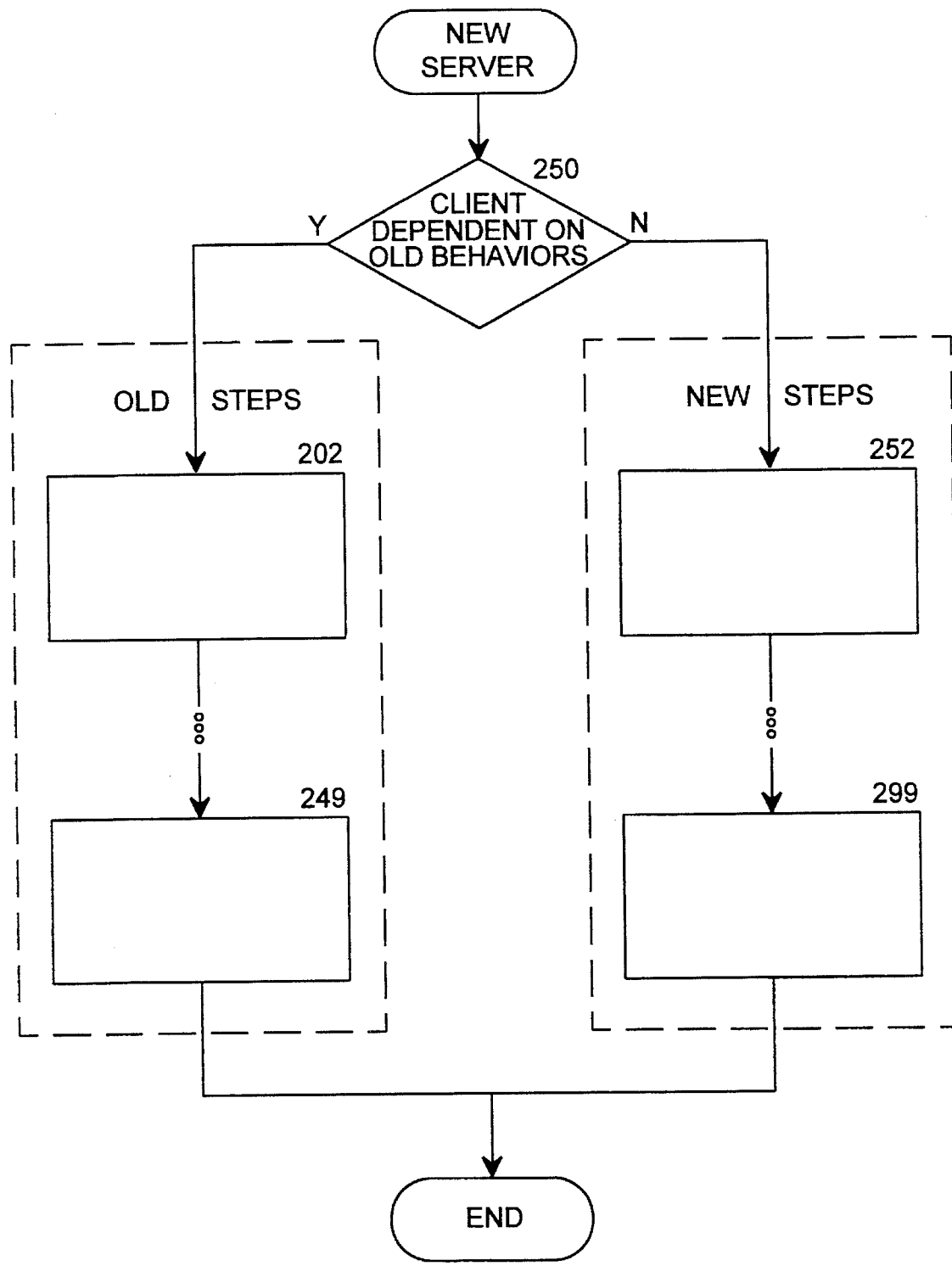
FIG. 2B is a flow diagram of a new server.

FIG. 1C is a flow diagram of an adapted API routine. The flow diagram shows common steps 101-150, decision step 160, incompatible steps 161-163, and substitute steps 151-152. During execution of the adapted API routine, the routine in step 160 determines whether the old behavior or new behavior should be performed and branches to the incompatible steps or the substitute steps.

Figure 4A:
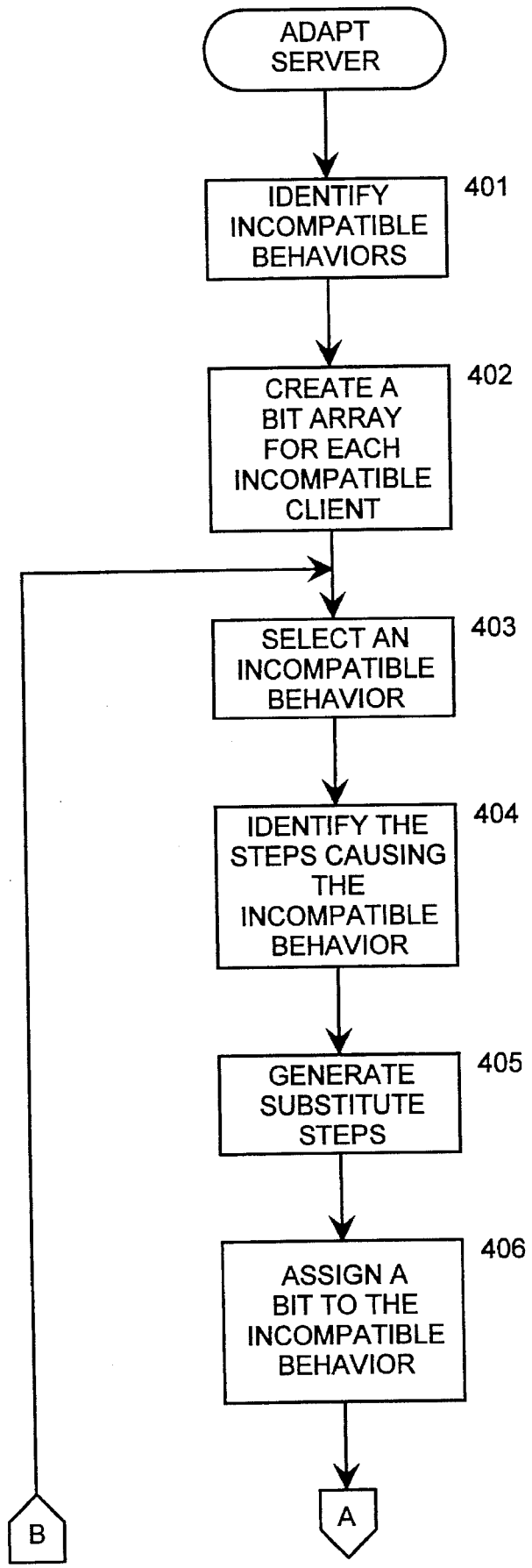
FIGS. 4A–4B are a flow diagram of the process of adapting a new server.
Figure 4B:
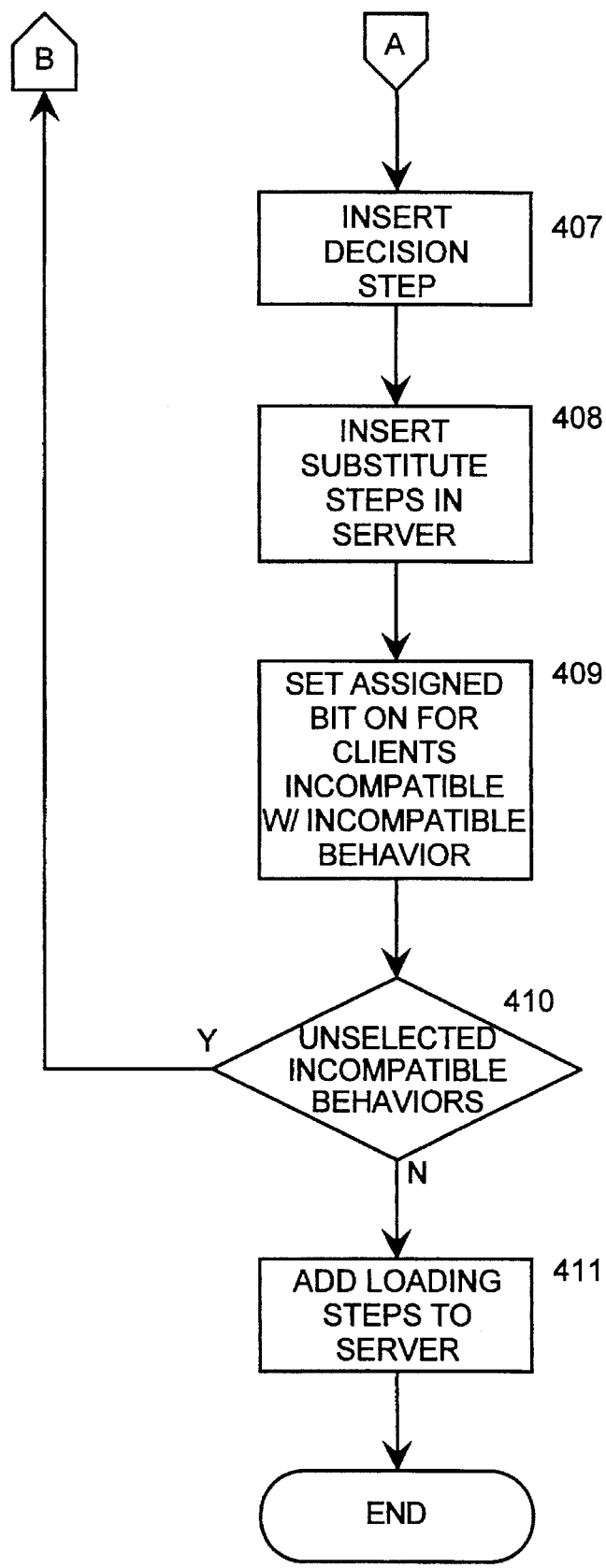

FIGS. 4A–4B are a flow diagram of the process of adapting a new server. In step 401, typically while testing the new server, a developer identifies the new behaviors of the new server with which clients are incompatible. These clients are known as incompatible clients. In step 402, the developer creates a bit array for each incompatible client.

In the loop of steps 403-409, the developer corrects each incompatibility failure in turn. In step 403, the developer selects an incompatible behavior. In step 404, the developer identifies the steps of the new server 161-163 that cause the selected incompatible behavior (incompatible steps).

In step 405, the developer generates substitute steps for the incompatible steps that perform the depended-upon old behavior in such a way that is integrated with the new server. The developer generates substitute steps by either using the corresponding code from a previous version of the server or by writing new code.

In step 406, the developer assigns an element in the bit arrays to indicate whether to execute the incompatible steps or the substitute steps. In step 407, the developer inserts a decision step 160 in the new server that checks the assigned bit and branches to the incompatible steps if the bit is off and branches to the substitute steps if the element is on. The developer then continues through junction A at step 408.

In step 408, the developer inserts the substitute steps 151-152 generated in step 404 into the new server in parallel with the incompatible steps. In step 409, the developer sets the assigned element to on for clients incompatible with the selected incompatible behavior. The developer leaves the assigned element off for clients compatible with the selected incompatible behavior. In step 410, if not all incompatible behaviors have been selected, then the developer continues through junction B at step 402 to correct another incompatibility failure, else the developer continues at step 411.

In step 411, the developer adds steps to the new server that loads the bit array associated with a client into memory when the client is activated. This code is discussed further below. The process then ends.

The adapted server's ability to execute substitute steps only for the clients that need them depends on the server's ability to determine whether a given client depends upon the old behavior associated with the substitute steps. The server uses a bit array data structure to store this information.

Figure 5:
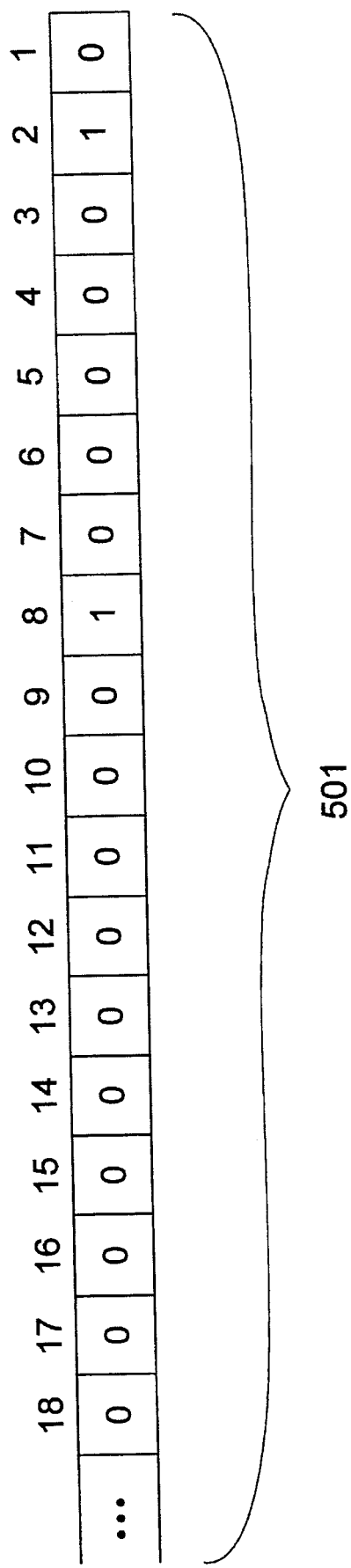
FIG. 5 is a diagram of the bit array data structure.

FIG. 5 is a diagram of the bit array data structure. It shows the bit array 501 to be composed of an ordered sequence of bits. Each bit is assigned to an incompatible behavior. If a bit is on, then the client with which the array of bits is associated requires the execution of the substitute steps to which the particular bit is assigned. If the bit is off, then the client does not require the execution of the substitute steps, and the incompatible steps are executed.

Figure 6:
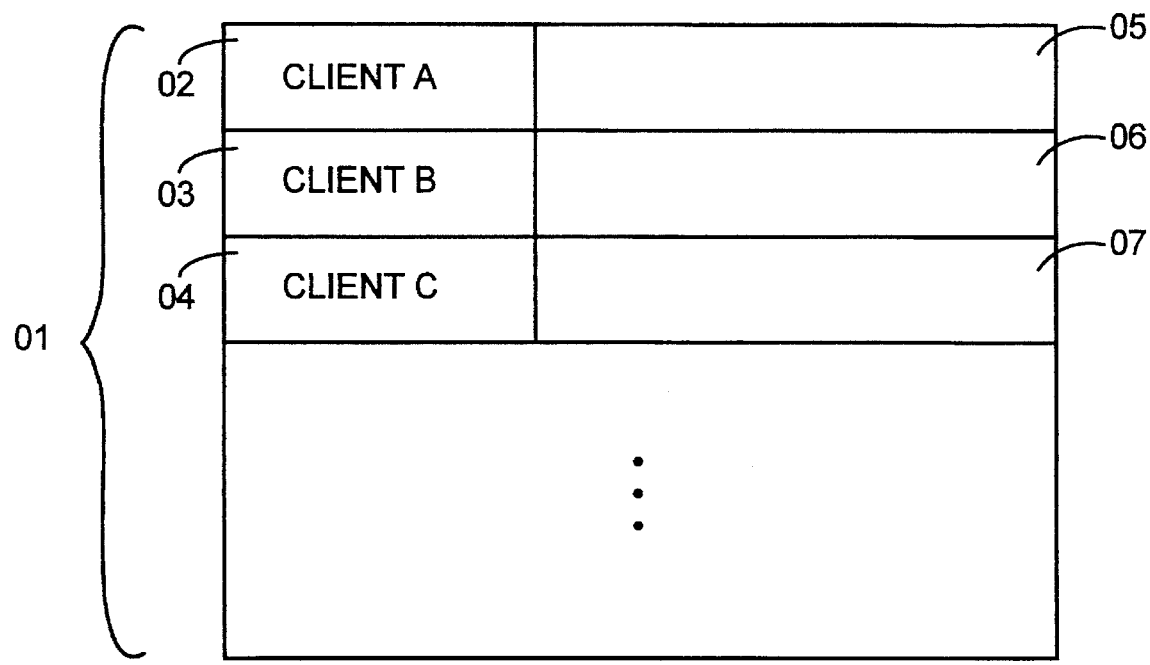
FIG. 6 is a diagram of the central bit array file.

Bit arrays are stored together in a central bit array file. FIG. 6 is a diagram of the central bit array file. Central bit array file 601 contains bit arrays 605-607 and client identifiers 602-604. The client identifiers each associate a bit array with a client. In a preferred embodiment, each client identifier is a unique name assigned by the client developer.

The central bit array file is preferably stored on an on-line storage device, usually a hard disk. When the adapted server is active and a client is activated, the server first checks to see if the client was created for the old server. If so, and if a bit array exists for the client, the server loads that bit array into memory. If the client was created for the new server or no bit array exists for the client, the server creates a bit array in which every bit is set to off. The server checks the bit array stored in memory when it reaches a set of incompatible and substitute steps.

The following example illustrates the operation of an adapted server that performs uppercase translation for a client that is dependent upon this behavior. The bit array for this client is shown in FIG. 5. The second bit in the bit array indicates that the old behavior (uppercase translation) is to be performed for this client.

When a user activates the server, the server is loaded into memory. When the user activates the client, the server loads the client's bit array. The client subsequently calls API routines within the server to request services.

When the execution of the server reaches the decision step that determines whether to perform the uppercase translation, the server checks the second bit. Since that bit is on, the server executes the steps for uppercase translation. Conversely, if the bit were off, the server the server would not execute the steps for uppercase translation.

While this invention has been shown and described with reference to preferred embodiments, it will be understood by those skilled in the art that various changes or modifications in form and detail may be made without departing from the spirit and scope of this invention. For example, the server and its client need not be an operating system and an application program respectively. They could instead be a network server and a network client, or a host computer interface and a telecommunications application used to connect to the host or another set of cooperative programs. Further, the client need not be a software system. The client could, for example, be the human computer user of a software application. Still further, instead of allowing a client to call routines within the server, the API could instead involve the client sending a stream of service requests to the server, which the server would parse and process. Also, instead of an array of bits, each specifying one of two alternative behaviors, the method could use an array of more capacious storage elements, each specifying one or more of several alternative behaviors.

Another alternative to an array of bits is a set of strings, each of which could be included in a special file to specify a certain behavior for a certain application.

We claim:

1. A method in a computer system of operating a server with a plurality of clients, such that the server provides one of a plurality of services when requested by one of the clients, each of the services having common steps and a plurality of behavior pairs, each behavior pair including a first alternative behavior and a second alternative behavior, the first alternative behavior corresponding to a series of one or more steps designed to be executed when the requesting client is one of a selected group of clients, the second alternative behavior corresponding to a series of one or more steps designed to be executed when the requesting client is not among the selected group of clients, the requesting client having associated with it an aggregation of indications, each indication being in either a first state or a second state, each indication corresponding to a behavior pair of one of the services and indicating whether the first alternative behavior or the second alternative behavior should be provided to the requesting client, the indications created after the client is completed without modifying the client, the method comprising the steps of:

for each of the clients, under control of the client, requesting one of the services from the server; and under control of the servers.

executing the common steps of the requested service; and for each behavior pair of the requested service, checking the indication associated with the requesting client that corresponds to the behavior pair of the requested service;

if the checked indication is in the first state, executing the series of steps of the requested service corresponding to the first alternative behavior; and if the checked indication is in the second state, executing the series of steps of the requested service corresponding to the second alternative behavior.

2. The method of claim 1, further including the step of loading the aggregation of indications associated with each client from a location external to the client into memory accessible to the server.

3. The method of claim 2 wherein the server is a newer version of an operating system, and the step of loading the aggregation of indications only occurs if the client was created for an older version of the operating system.

4. A method in a computer system of operating a server with a plurality of clients, the server designed to provide a service to each client, the service having common steps and a plurality of behavior pairs, each of the behavior pairs including a new behavior and an old behavior, the new behavior corresponding to a series of one or more steps that one or more clients is not compatible with, the old behavior corresponding to a series of one or more steps that replaces the function of the new behavior and that is compatible with those clients with which the series of steps associated with the new behavior is not compatible, the method comprising the step of:

for each of the clients, loading an array of bits associated with the client from a location external to the client, each bit being in either a first state or a second state;

under control of the client, requesting the service from the server: and under control of the server, for each of the behavior pairs, checking an element of the loaded array of bits that corresponds to the behavior pair of the service;

if the checked element is in the first state, executing the series of steps corresponding to the new behavior; and if the checked element is in the second state, executing the series of steps corresponding to the old behavior; and executing the common steps.

5. The method of claim 4, in which the array of bits loaded in the loading step is created after development of the client is complete, without modifying the client.

6. The method of claim 5 wherein the server provides a plurality of services, each service having a plurality of behavior pairs, and in which the steps of checking the element of the array of bits, executing the series of steps corresponding to the new behavior, and executing the series of steps corresponding to the old behavior are performed for each of the behavior pairs of each service requested by a client.

7. The method of claim 5 wherein the server is a newer version of an operating system, and the step of loading the array of bits only occurs if the client was created for an older version of the operating system.

8. A method of adapting a server that provides a service to a first group of one or more clients to also provide the service to a second group of one or more clients without modifying clients of the second group, the server having behaviors, each behavior having steps, each step having a function, the steps required to provide the service to the first group of clients being incompatible with the second group of clients, the method comprising the steps of:

for each behavior,
  determining which steps of the server are incompatible with the clients of the second group;
  creating a series of one or more substitute steps that approximate the functions of the incompatible steps and are compatible with the clients of the second group; and
  creating a decision step in the server wherein, when a client requests the service, the server detects whether the requesting client is in the first group of clients or the second group of clients, and if the requesting client is in the first group, the incompatible steps are executed, and if the requesting client is in the second group, the substitute steps are executed.

9. A method of adapting and operating a server that provides a service to a first group of one or more clients to also provide the service to a second group of one or more clients without modifying clients of the second group, the server having behaviors, each behavior having steps, each step having a function, the steps required to provide the service to the first group of clients being incompatible with the second group of clients, the method comprising the steps of:

for each behavior,
  determining which steps of the server are incompatible with the clients of the second group; and
  creating a series of one or more substitute steps that approximate the functions of the incompatible steps and are compatible with the clients of the second group; and
for each client requesting the service,
for each behavior,
  detecting whether the requesting client is in the first group of clients or the second group of clients;
  if the requesting client is in the first group, executing the incompatible steps; and
  if the requesting client is in the second group, executing the substitute steps; and
  executing the steps of the server not determined to be incompatible with clients of the second group.

10. The method of claim 9 wherein the requesting client has associated with it a bit that indicates whether the requesting client is in the first group of clients or the second group of clients for each behavior, the bit created after the requesting client is completed without modifying the requesting client, in which the step of detecting whether the requesting client is in the first group of clients or the second group of clients includes the step of checking the bit associated with the requesting client for that behavior.

11. The method of claim 10 wherein the requesting client has a bit associated with it for each behavior, each bit created after the requesting client is completed without modifying the requesting client, in which the step of detecting whether the requesting client is in the first group of clients or the second group of clients further includes the step of loading the bit associated with the requesting client for that behavior from a location external to the requesting client.

12. The method of claim 11, further including the step of, after creating the substitute steps, setting a bit associated with each client in the first group for each behavior to a first state so that the incompatible steps are executed, and setting a bit associated with each client in the second group for each behavior to a second state so that the substitute steps are executed.

13. The method of claim 11, in which the server is a newer version of an operating system, and the step of loading a bit associated with the requesting client for that behavior only occurs if the client was created for an older version of the operating system.

14. An apparatus for operating a server with a plurality of clients, the server designed to provide a service to each client, the service having common steps and a plurality of behavior pairs, each of the behavior pairs including a new behavior and an old behavior, the new behavior corresponding to a series of one or more steps that one or more clients is not compatible with, the old behavior corresponding to a series of one or more steps that replaces the function of the new behavior and that is compatible with those clients with which the series of steps associated with the new behavior is not compatible, the apparatus comprising:

means for loading an array of bits for each client from a location external to that client, each bit being in either a first state or a second state, each bit corresponding to a behavior pair;

means for checking each bit in each loaded array of bits that corresponds to one of the behavior pairs of the service for each client;

means for executing the series of steps corresponding to the new behavior of each behavior pair for each client for which the checked bit is in the first state; and means for executing the series of steps corresponding to the old behavior of each behavior pair for each client for which the checked bit is in the second state.

15. The apparatus of claim 14 wherein the server apparatus is a newer version of a software product, and the loading means only operates for each client that was created for an older version of the operating system.

16. A method in a computer system for operating a server program so that a new version of the server program provides backward compatibility with an old version of the server program, the method comprising the steps of:

creating a plurality of flags for a client program, the client program being compatible with the old version of the server program, each flag associated with a new behavior of the new version and an old behavior of the old version;

for each of the plurality of flags, when the client program is compatible with the new behavior, setting the flag to indicate that the client program is compatible with the new behavior, and when the client program is compatible with the old version of the server program, setting the flag to indicate that the client program is compatible with the old behavior;

under control of the client program, sending a request to the new version of the server program to perform a service;

under control of the server program:

receiving the request to perform the service, and when performing the requested service, for each of the plurality of flags:

when the flag indicates that the client program is compatible with the old behavior, performing the old behavior; and when the flag indicates that the client program is compatible with the new behavior, performing the new behavior, wherein the server program performs at least one new behavior for the client program.

17. A method in a computer system of operating a server with a client, the server designed to provide a service to the client, the service having common steps and a plurality of behavior groups, each of the behavior groups including one or more alternative behaviors, each alternative behavior having a series of steps, the method comprising the steps of:

associating a plurality of indications with the client, each of the indications associated with one of the behavior groups and indicating the alternative behavior in that behavior group with which the client is compatible;

under control of the client, requesting the service provided by the server; and under control of the server, executing the common steps; and for each of the behavior groups, determining the alternative behavior of that behavior group with which the client is compatible using the indication associated with that behavior group; and executing the steps of the determined alternative behavior.

18. The method of claim 17 wherein the step of determining the alternative behavior of that behavior group with which the client is compatible using the indication associated with that behavior group determines that none of the alternative behaviors of that behavior group are compatible with the client and wherein the step of executing the steps of the determined alternative behavior does not execute any steps.

19. The method of claim 17, in which the step of associating a plurality of indications with the client occurs after development of the client is complete, without modifying the client.

20. The method of claim 17, further including the step of loading the plurality of indications associated with the client from a location external to the client into memory accessible to the server.

21. The method of claim 20 wherein the server is a newer version of a software product, and in which the step of loading the plurality of indications only occurs if the client was created for an older version of the same software product.

22. A method in a computer system of operating a server with a plurality of clients, the server designed to provide a service to each of the clients, the service having common steps and a plurality of behavior groups, each behavior group including alternative behaviors, the method comprising the steps of:

for each of the clients, for each of the behavior groups, associating an indication with the client that indicates which of the alternative behaviors of that behavior group is to be provided to the client; and under control of the client, requesting the service from the server; and under control of the server, upon receiving a request for the service from a client, executing the common steps; and for each of the behavior groups, checking the indication associated with the requesting client that indicates which of the alternative behaviors of that behavior group is to be provided to the client; and executing the alternative behavior indicated by the checked indication.

23. A computer-readable storage medium containing instructions that cause a computer system to:

associate a plurality of indications with a client, the client being provided with a service from a server, the service having common steps and a plurality of behavior groups, each of the behavior groups including one or more alternative behaviors, each alternative behavior having a series of steps, each of the indications associated with one of the behavior groups and indicating the alternative behavior in that behavior group with which the client is compatible;

under control of the client, request the service provided by the server; and under control of the server, execute the common steps; and for each of the behavior groups, determine the alternative behavior of that behavior group with which the client is compatible using the indication associated with that behavior group; and execute the steps of the determined alternative behavior.

24. The computer-readable storage medium of claim 23 wherein the instructions that cause the computer system to associate the plurality of indications with the client cause the computer system to associate the plurality of indications with the client after development of the client is complete, without modifying the client.

25. The computer-readable storage medium of claim 23, further comprising instructions that cause the computer system to load the plurality of indications associated with the client from a location external to the client into memory accessible to the server.

26. The computer-readable storage medium of claim 25 wherein the server is a newer version of a software product and wherein the instructions that cause the computer system to load the plurality of indications cause the computer system to load the plurality of indications only if the client was created for an older version of the same software product.

27. The computer-readable storage medium of claim 23 wherein the instructions that cause the computer system to determine the alternative behavior of that behavior group with which the client is compatible cause the computer system to determine that none of the alternative behaviors of that behavior group are compatible with the client and wherein the construction that cause the computer system to execute the steps of the determined alternative behavior cause the computer system to execute no steps.

28. A computer-readable storage medium containing instructions that cause a computer system to:

for each of a plurality of clients, load an array of bits associated with the client from a location external to the client, each bit being in either a first state or a second state; and under control of the client, request a service from a server, the server designed to provide the service to the client, the service having common steps and a plurality of behavior pairs, each of the behavior pairs including a new behavior and an old behavior, the new behavior corresponding to a series of one or more steps that one or more clients is not compatible with, the old behavior corresponding to a series of one or more steps that replaces the function of the new behavior and that is compatible with those clients with which the series of steps associated with the new behavior is not compatible; and under control of the server, for each of the behavior pairs, check an element of the loaded array of bits that corresponds to the behavior pair of the service;

execute the series of steps corresponding to the new behavior if the checked element is in the first state; and execute the series of steps corresponding to the old behavior if the checked element is in the second state; and execute the common steps.

29. The computer-readable storage medium of claim 28 wherein the array of bits that the instructions cause the computer system to load is created after development of the client is complete, without modifying the client.

30. The computer-readable storage medium of claim 29 wherein the server provides a plurality of services, each service having a plurality of behavior pairs, and wherein the instructions that cause the computer system to check the element of the loaded array of bits, execute the series of steps corresponding to the new behavior, and execute the series of steps corresponding to the old behavior are performed for each of the behavior pairs of each service requested by a client.

31. The computer-readable storage medium of claim 29 wherein the server is a newer version of an operating system and wherein the instructions that cause the computer system to load the array of bits cause the computer system to load the array of bits only if the client was created for an older version of the operating system.

* * * * *